United States Patent [19]

Laske et al.

[11] Patent Number: 5,447,326
[45] Date of Patent: Sep. 5, 1995

[54] VEHICLE DOOR WITH PRE-DEPLOYED AIR BAG

[75] Inventors: Timothy G. Laske, Ann Arbor; Roger P. Daniel, Dearborn; Sarah L. Kirkish, Inkster, all of Mich.

[73] Assignee: Ford Motor Company, Dearborn, Mich.

[21] Appl. No.: 979,037

[22] Filed: Nov. 20, 1992

[51] Int. Cl.⁶ .................... B60R 21/16; B60R 21/22
[52] U.S. Cl. ................. 280/728.3; 280/730.2
[58] Field of Search ........... 280/728, 730, 730 A, 280/728 R, 728 A, 728 B, 730 R

[56] References Cited

U.S. PATENT DOCUMENTS

| | | | |
|---|---|---|---|
| 2,834,606 | 5/1958 | Bertrand | 280/730 |
| 3,630,472 | 12/1971 | Axenborg | 280/730 A |
| 3,791,667 | 2/1974 | Haviland | 280/730 |
| 3,887,214 | 6/1975 | Brawn | 280/730 |
| 4,946,191 | 8/1990 | Putsch | 280/730 |
| 4,966,388 | 10/1990 | Warner et al. | 280/730 |
| 5,125,682 | 6/1992 | Hensler et al. | 280/743 A |

FOREIGN PATENT DOCUMENTS

| | | | |
|---|---|---|---|
| 249740 | 10/1990 | Japan | 280/728 A |
| 2267065 | 11/1993 | United Kingdom . | |

*Primary Examiner*—Eric D. Culbreth
*Attorney, Agent, or Firm*—Daniel M. Stock; Roger L. May

[57] ABSTRACT

A vehicle door includes an inner panel, an outer panel joined to the inner panel, a door trim substrate mounted on the inner panel, and a door trim cover mounted on the door trim substrate to form a space therebetween. The vehicle door also includes a generally pre-deployed air bag disposed in the space between the door trim substrate and the door trim cover for inflation upon a side collision type impact on the vehicle door.

19 Claims, 2 Drawing Sheets

VEHICLE DOOR WITH PRE-DEPLOYED AIR BAG

BACKGROUND OF THE INVENTION

1. Field of the Invention

The present invention relates generally to air bags for vehicles and, more particularly, to an air bag for a door of a vehicle.

2. Description of the Related Art

It is known to construct doors for vehicles such as automotive vehicles. Typically, the door includes an inner and outer panel joined to each other and pivotally connected to vehicle structure in a well known manner. The vehicle door also includes a decorative door trim panel mounted to the inner panel.

It is also known that the vehicles may collide with obstacles during operation. As a result, automotive vehicles have provided various structures to lessen the effects of a collision type impact on an occupant compartment of the vehicle. For example, some automotive vehicles may include an air bag to lessen the effects of a collision type impact. While air bags provide an advantage in lessening the effects from a collision type impact, they suffer from the disadvantage that it is extremely difficult to deploy the air bag in sufficient time when installed in a vehicle door. Also, they suffer from the disadvantage that the air bag is generally disposed behind the door trim panel which may have a relatively large mass that would interact with the occupant compartment when the air bag is inflated.

SUMMARY OF THE INVENTION

Accordingly, the present invention is a vehicle door including an inner panel, an outer panel joined to the inner panel, a door trim substrate mounted to the inner panel, and a door trim cover mounted on the door trim substrate to form a space therebetween. The vehicle door also includes a generally pre-deployed air bag means disposed in the space between the door trim substrate and the door trim cover for inflation upon a side collision type impact on the vehicle door.

One advantage of the present invention is that an air bag is incorporated in a vehicle door to lessen the effects of a side collision type impact. Another advantage of the present invention is that a vehicle door incorporates an air bag which is generally pre-deployed to allow inflation in sufficient time to help provide protection to the occupant compartment during a side collision type impact. Yet another advantage of the present invention is that the air bag is generally pre-deployed and overlayed onto a substrate of a door trim panel instead of being packed into or disposed in a small, space-consuming pocket behind the door trim panel substrate. Still another advantage of the present invention is that the air bag is generally pre-deployed behind a cover built as part of the door trim panel and acts to minimize the mass which interacts with the occupant compartment when the air bag is inflated, yet allows for increased rigidity of the door trim panel to help distribute the load over a larger surface of the airbag.

Other objects, features and advantages of the present invention will be readily appreciated as the same becomes better understood after reading the following description taken in light of the accompanying drawings.

DESCRIPTION OF THE PREFERRED EMBODIMENT(S)

Figure 1:
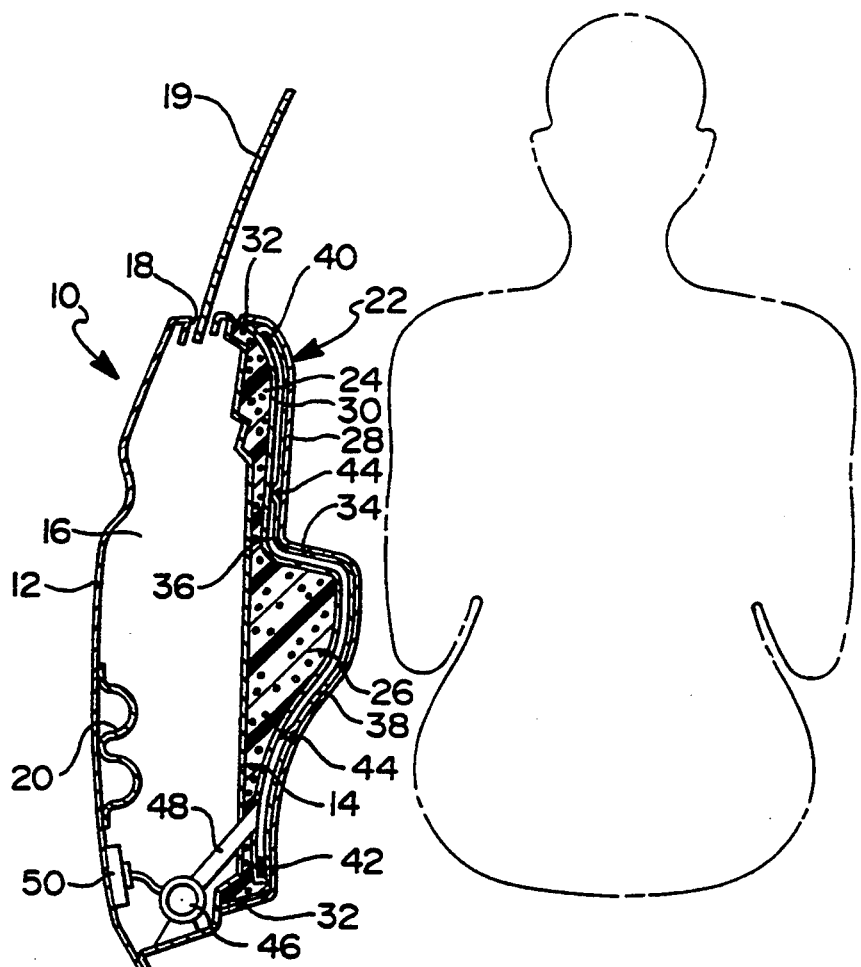
FIG. 1 is a rear fragmentary elevational view of a vehicle door with a generally pre-deployed air bag, according to the present invention, illustrated in operational relationship to an occupant of a vehicle.
Figure 2:
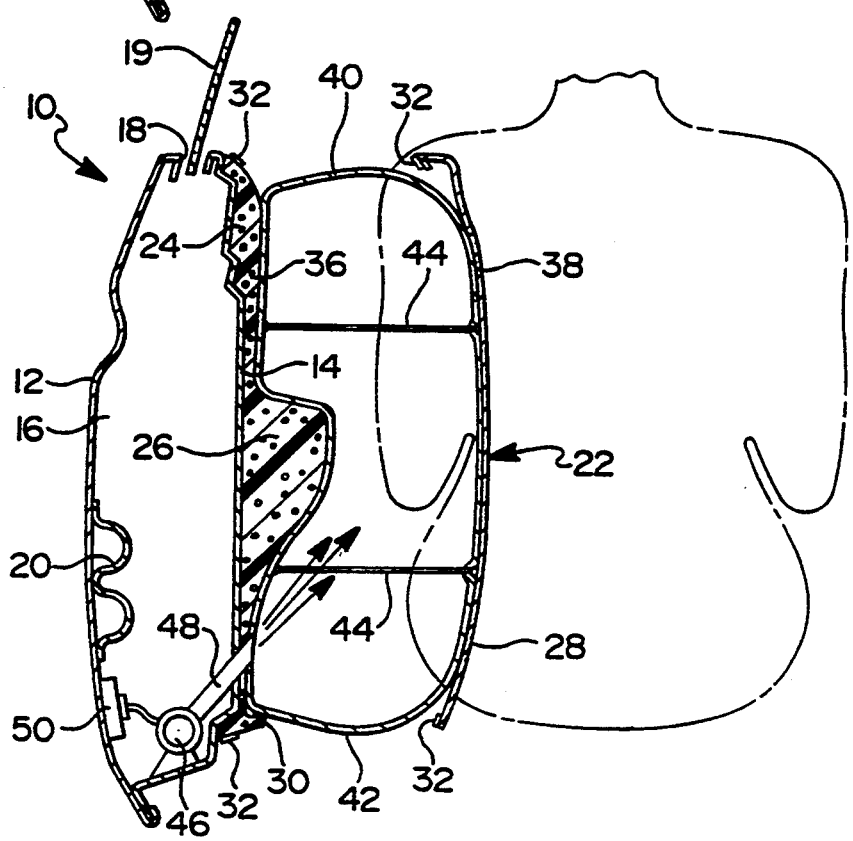
FIG. 2 is a view similar to FIG. 1 with the pre-deployed air bag illustrated in an inflated state.

Turning now to the drawings and in particular to FIGS. 1 and 2 thereof, a vehicle door 10 according to the present invention is illustrated in operational relationship with an occupant in an occupant compartment of a vehicle such as an automotive vehicle (not shown). It should be appreciated that the vehicle door 10 is moveable and connected to the remaining structure of the vehicle as is known in the art.

The vehicle door 10 includes an outer panel 12 and an inner panel 14 joined together and forming a space 16 therebetween. The vehicle door 10 may also include an aperture 18 at an upper end thereof for receiving a window 19. The window 19 may move in and out of the space 16 as is known in the art. The vehicle door 10 may further include an intrusion or door guard beam 20 extending longitudinally in the space 16 between the outer and inner panels 12, 14 which is secured to the outer panel 12 by suitable means such as welding. It should be appreciated that the vehicle door 10 may include a window regulator device, door latch, and other components of a vehicle door as known in the art.

The vehicle door 10 includes an air bag assembly, according to the present invention and generally indicated at 22, mounted on the inner panel 14. The air bag assembly 22 includes a door trim substrate 24 secured to the inner panel 14 by suitable means such as an adhesive. The door trim substrate 24 may include an arm rest portion 26 extending inwardly into an occupant compartment of the vehicle. The door trim substrate 24 is made of a suitable material such as a relatively rigid layer of plastic, foam or the like. It should be appreciated that the door trim substrate 24 may also act to absorb impact energy during predetermined conditions.

The air bag assembly 22 also includes a door trim cover 28 mounted on the substrate 24 to form a space 30 therebetween. The door trim cover 28 may be mounted on the substrate 24 by suitable means such Dual Lock ® or Velcro ® strips 32 or the like and, in fact, may be tethered to the inner panel 14 to help control door trim panel movement. Preferably, the strips 32 have a portion secured to upper, lower, forward and rear ends of the door trim substrate 24 and cover 28 by suitable means such as an adhesive. The door trim cover 28 is made of a suitable material such as a relatively lightweight, soft, thin layer of cloth, vinyl, leather, carpeting, or a combination thereof.

The air bag assembly 22 also includes a generally pre-deployed gas or air bag 34 disposed in the space 30 between the door trim substrate 24 and cover 28. The air bag 34 has inner and outer edges 36 and 38 interconnected by upper and lower edges 40 and 42, respectively. Preferably, the inner edge 36 is mounted to the door trim substrate 24 by suitable means such as an adhesive. The outer edge 38 may be mounted to the door trim cover 28 by suitable means such as an adhesive or laminated. The air bag 34 includes at least one vent (not shown) to absorb energy via escaping gas upon impact. The air bag assembly 22 may include at least one, preferably a plurality of tethers 44 to help control the deployment and expansion of the air bag 34. The tethers 44 may have one end connected to the door trim substrate 24 and the other end connected to the door trim cover 28. Alternatively, the tethers 44 may have one end connected to the inner edge 36 and other end connected to the outer edge 38 of the air bag 34. It should be appreciated that the air bag 34 can be formed as one or more pieces, and could include separate bags inflating to different pressures.

The air bag assembly 22 includes at least one inflator 46 for inflating the air bag 34. The inflator 46 is disposed in the space 16 and mounted to the inner panel 14 by suitable means such as welding. Alternatively, the inflator 46 may be mounted inside of the air bag 34. The air bag assembly 22 also includes at least one duct 48 connected to the output for the inflator 46, extending through the door trim substrate 24, and connected to the inner edge 36 of the air bag 34. The duct 48 directs the gas in a direction that will minimize inflation time without overloading the occupant compartment due to a "gas jet" effect. The air bag assembly 22 also includes at least one sensor 50 disposed in the space 16 and mounted to the outer panel 12. The sensor 50 detects or senses an impact on the vehicle door 10 and actuates the inflator 46. It should be appreciated that the sensor 50 may be mounted on the intrusion beam 20 and is of the type to sense an impact in approximately one to five milliseconds (ms). It should also be appreciated that the inflator 46 and duct 48 deploy the gas upwardly into a side region of the occupant compartment as illustrated by the arrows and inflate the air bag 34 in approximately twenty milliseconds (20 ms).

Figure 3:
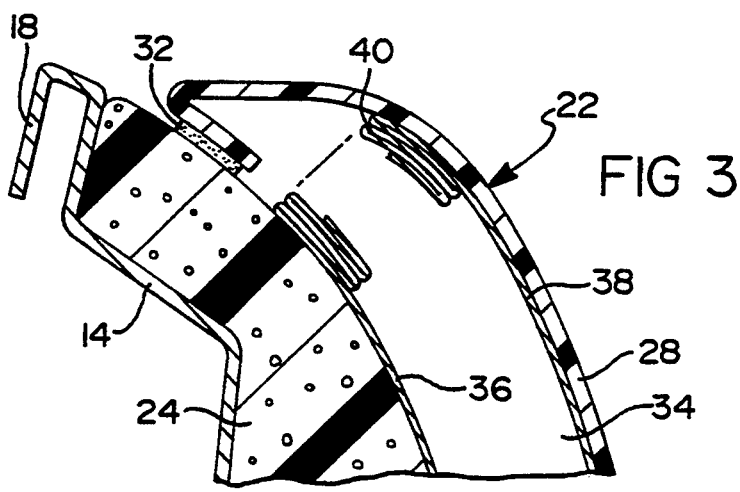
FIG. 3 is a partial enlarged view of an upper end of the vehicle door of FIGS. 1 and 2 with the pre-deployed air bag in an uninflated state.
Figure 5:
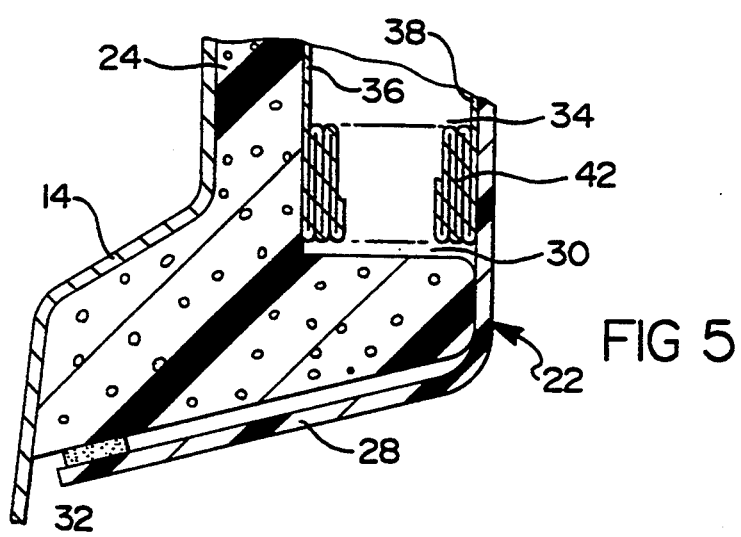
FIG. 5 is a partial enlarged view of a lower end of the vehicle door of FIGS. 1 and 2 with the pre-deployed air bag in an uninflated state.

Referring to FIGS. 3 and 5, the air bag 34 is generally pre-deployed, to the extent possible, and extends vertically and longitudinally along the door trim substrate 24. The upper, rear and lower edges 40 and 42 of the air bag 34 may be folded in an accordion manner to dispose the air bag 34 in the space 30. It should be appreciated that generally pre-deployed means that the air bag 34 is partially extended along the door trim substrate 24 as opposed to being fully folded into a pouch and packed into the space 30. It should also be appreciated that the folded edges 40 and 42 may be extra material or folded flaps of the air bag 34 which, when inflated, extend to cover the belt line (not shown) and B-pillar (not shown) for the vehicle door 10.

Figure 4:
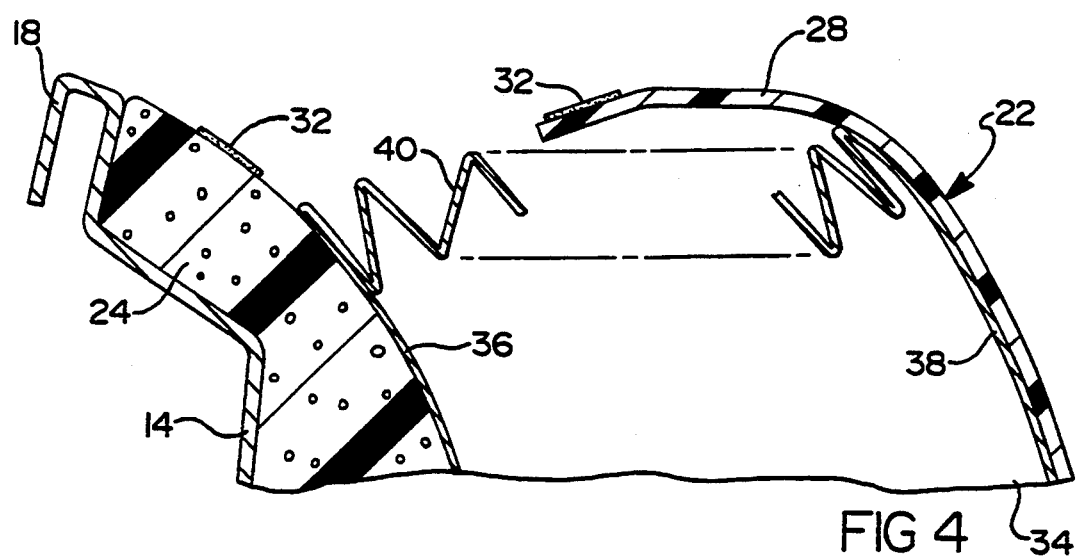
FIG. 4 is a view similar to FIG. 3 with the pre-deployed air bag illustrated in a partially inflated state.

In operation, the air bag 34 is pre-deployed, folded at its edges 40, 42 to the extent needed to fit into and disposed in the space 30 in an uninflated state as illustrated in FIGS. 1, 3 and 5. The door trim cover 28 is mounted on the door trim substrate 24 via strips 32. When the vehicle door 10 is subject to a side collision type impact, the sensor 50 senses the impact and actuates the inflator 46. The inflator 46 expels gas or air through the duct 48 and into the air bag 34. As the air bag 34 inflates, it expands and causes at least part of the door trim cover 28 to detach or disengage the door trim substrate 24 as illustrated in FIG. 4. The air bag 34 continues to inflate and expand into the occupant compartment and is controlled by the tethers 44 to an inflated state as illustrated in FIG. 2. After the impact, the air bag 34 deflates rapidly as gas is vented.

Accordingly, the vehicle door 10 incorporates an air bag assembly 22 to lessen the effects of a side collision type impact on an occupant compartment of the vehicle. The air bag 34 is generally pre-deployed under a relatively lightweight, soft door trim cover 28 which minimizes the mass interacting with the occupant compartment. Since the air bag 34 is generally pre-deployed, to the extent possible, it is inflated in sufficient time to help provide protection to the occupant compartment during a side collision type impact.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A vehicle door comprising:
   an inner panel;
   an outer panel joined to said inner panel;
   a door trim substrate mounted on said inner panel;
   a door trim cover mounted on said door trim substrate to form a space therebetween; and
   generally pre-deployed air bag means extending vertically and longitudinally and disposed in the space between said door trim substrate and said door trim cover for inflation upon an impact on said vehicle door by another object, said air bag means causing said door trim cover to detach said door trim substrate upon inflation.

2. A vehicle door as set forth in claim 1 wherein said air bag means comprises at least one air bag having inner and outer edges and upper and lower edges interconnecting said inner and outer edges.

3. A vehicle door as set forth in claim 2 including means for securing said inner edges of said air bag to said door trim substrate.

4. A vehicle door as set forth in claim 3 including means for securing said outer edges of said air bag to said door trim cover.

5. A vehicle door as set forth in claim 2 wherein said upper and lower edges are folded in an accordion manner.

6. A vehicle door as set forth in claim 1 including means for removably securing said door trim cover to said door trim substrate.

7. A vehicle door as set forth in claim 6 wherein said securing means comprises a plurality of interlocking strips secured to said door trim substrate and said door trim cover and cooperating together to removably secure said door trim cover to said door trim substrate.

8. A vehicle door as set forth in claim 1 including means for controlling inflation of said air bag means.

9. A vehicle door as set forth in claim 8 wherein said controlling means comprises at least one tether interconnecting said door trim substrate and said door trim cover.

10. A vehicle door as set forth in claim 8 wherein said controlling means comprises at least one tether interconnecting said inner and outer edges of said air bag.

11. A vehicle door as set forth in claim 1 wherein said air bag means includes at least one-sensor for sensing an impact on said vehicle door.

12. A vehicle door as set forth in claim 11 wherein said air bag means includes at least one inflator connected to said sensor to inflate said air bag means upon an impact sensed by said sensor.

13. A vehicle door as set forth in claim 12 including at least one duct connected to said inflator and said air bag means and orientated to expel gas upwardly toward the occupant.

14. A vehicle door comprising:
an inner panel;
an outer panel joined to said inner panel; and
an air bag assembly mounted on said inner panel and including a door trim substrate mounted on said inner panel, a door trim cover removably secured to said door trim substrate to form a space therebetween, and at least one air bag disposed in the space and having a partially extended position extending vertically and longitudinally along said vehicle door in an uninflated state and a fully extended position in an inflated state upon an impact on said vehicle door by another object, said at least one air bag causing said door trim cover to detach said door trim substrate upon inflation.

15. A vehicle door as set forth in claim 14 wherein said air bag has inner and outer edges and upper and lower edges interconnecting said inner and outer edges, said inner edges being secured to said door trim substrate.

16. A vehicle door as set forth in claim 15 including means for removably securing said door trim cover to said door trim substrate.

17. A vehicle door as set forth in claim 15 including means for controlling inflation of said air bag.

18. A vehicle door as set forth in claim 15 wherein said upper and lower edges are folded in an accordion manner.

19. A vehicle door comprising:
an inner panel;
an outer panel joined to said inner panel;
a door trim substrate mounted on said inner panel;
a door trim cover mounted on said door trim substrate to form a space therebetween;
a generally pre-deployed air bag extending vertically and longitudinally and disposed in the space between said door trim substrate and said door trim cover, said air bag having inner and outer edges and upper and lower edges interconnecting said inner and outer edges, said inner edges of said air bag being secured to said door trim substrate;
a plurality of interlocking strips secured to said door trim substrate and said door trim cover and cooperating together;
at least one tether interconnecting said door trim substrate and said door trim cover for controlling inflation of said air bag;
at least one sensor for sensing an impact on said vehicle door;
at least one inflator connected to said sensor to inflate said air bag upon an impact sensed by said sensor; and
at least one duct connected to said inflator and said air bag and oriented to expel gas upwardly toward the occupant, said air bag causing said door trim cover to detach said door trim substrate upon inflation.

* * * * *